(12) United States Patent
Mennekens

(10) Patent No.: US 10,651,889 B2
(45) Date of Patent: May 12, 2020

(54) METHOD AND DEVICE FOR THE DETECTION OF A PULSE OF A SIGNAL

(71) Applicant: UWINLOC, Blagnac (FR)

(72) Inventor: Jan Mennekens, Péguilhan (FR)

(73) Assignee: UWINLOC, Blagnac (FR)

( * ) Notice: Subject to any disclaimer, the term of this patent is extended or adjusted under 35 U.S.C. 154(b) by 0 days.

(21) Appl. No.: 16/468,504

(22) PCT Filed: Dec. 11, 2017

(86) PCT No.: PCT/EP2017/082278
§ 371 (c)(1),
(2) Date: Jun. 11, 2019

(87) PCT Pub. No.: WO2018/108837
PCT Pub. Date: Jun. 21, 2018

(65) Prior Publication Data
US 2020/0091956 A1    Mar. 19, 2020

(30) Foreign Application Priority Data
Dec. 12, 2016 (FR) ..................... 16 62287

(51) Int. Cl.
*H04L 27/06* (2006.01)
*H04B 1/709* (2011.01)
*H04B 1/69* (2011.01)

(52) U.S. Cl.
CPC ..... *H04B 1/709* (2013.01); *H04B 2001/6908* (2013.01); *H04B 2201/70709* (2013.01)

(58) Field of Classification Search
CPC .......... H04B 1/709; H04B 2201/70709; H04B 2001/6908
(Continued)

(56) References Cited

U.S. PATENT DOCUMENTS

2001/0053175 A1    12/2001   Hoctor et al.
2008/0008230 A1*   1/2008    Lee ........................ H04B 1/707
                                                                 375/150
(Continued)

FOREIGN PATENT DOCUMENTS

EP        2790035        10/2014

OTHER PUBLICATIONS

International Search Report dated Apr. 23, 2018 for International Application No. PCT/ EP2017/082278.
(Continued)

*Primary Examiner* — Don N Vo
(74) *Attorney, Agent, or Firm* — Perman & Green, LLP

(57) ABSTRACT

A method for the detection of a pulse of a signal received by a receiver device, the received signal corresponding to data emitted with a predetermined period $T_c$, each piece of data being encoded by a presence or an absence of a pulse. The method includes: temporally offsetting of the received signal according to a predetermined number $N_s$ of delays corresponding to different multiples of $T_c$, so as to generate $N_s$ delayed signals; correlating, at a time that is a candidate for the detection of a pulse, the received signal with each of the delayed signals, in so as to obtain $N_s$ correlation values associated with the candidate time; calculating a maximum correlation value among the $N_s$ correlation values associated with the candidate time; and detecting a pulse of the received signal according to the maximum correlation value.

20 Claims, 2 Drawing Sheets

(58) Field of Classification Search
USPC .................................. 375/138, 343
See application file for complete search history.

(56) References Cited

U.S. PATENT DOCUMENTS

| | | | | |
|---|---|---|---|---|
| 2008/0043858 | A1* | 2/2008 | Lim | H04J 11/00 |
| | | | | 375/260 |
| 2011/0129003 | A1* | 6/2011 | Yamagata | G01S 19/24 |
| | | | | 375/150 |
| 2017/0245231 | A1* | 8/2017 | Huang | H04L 27/2613 |

OTHER PUBLICATIONS

"An Energy-Efficient IR-UWB Receiver Based on Distributed Pulse Correlator" Jianyun Hu et al (14 pages) IEEE Transactions on Microwave Theory and Techniques, vol. 61, No. 6, dated Jun. 2013.
"A 70 PJ/Pulse Analog Front-End in 130 NM CMOS for UWB Impulse Radio Receivers" Nick Van Helleputte et al (10 pages) IEEE Journal of Solid-State Circuits, vol. 44, No. 7, dated Jul. 2009.

* cited by examiner

METHOD AND DEVICE FOR THE DETECTION OF A PULSE OF A SIGNAL

CROSS REFERENCE TO RELATED APPLICATIONS

This application is a National Stage of International Application No. PCT/EP2017/082278, having an International Filing Date of 11 Dec. 2017, which designated the United States of America, and which International Application was published under PCT Article 21(2) as WO Publication No. 2018/108837 A1, which claims priority from and the benefit of French Patent Application No. 1662287, filed on 12 Dec. 2016, the disclosures of which are incorporated herein by reference in their entireties.

BACKGROUND

1. Field

The present disclosure belongs to the field of systems for locating objects, and relates more particularly to a method for detection, by a receiver device, of pulses of a signal. The present disclosure has a particularly advantageous, although in no way limiting, use in ultra-wideband wireless location systems.

2. Brief Description of Related Developments

"Ultra-Wideband" ("Ultra Wide Band", also designated by the acronym UWB, in the Anglo-Saxon literature) refers to radioelectric signals emitted by one or more emitter devices to one or more receiver devices of said location system, and having an instantaneous frequency spectrum having a width (at −10 dB with respect to the maximum power of said instantaneous frequency spectrum) greater than 500 megahertz.

The uses of UWB are diverse, and generally relate to the local wireless transmission of digital data at a high bitrate, but also to radars or medical imaging systems.

More particularly, UWB systems are advantageously adapted for the location of radio markers (also called radio-frequency identification tags) placed respectively on fixed positioned objects in a closed environment, for example such as a hangar, or moving near a zone specifically configured to carry out said location.

In general, an emitter device of such a location system emits a radio signal to a plurality of receiver devices. The information carried on this radio signal conventionally corresponds to data encoded via a modulation of a particular type, for example a modulation of the "OOK" type (acronym for the Anglo-Saxon expression "On-Off Keying"). The radio signal thus emitted takes the form of a train of pulses having very short respective lengths, for example approximately one nanosecond. These pulses extremely short in the time domain have, in the frequency domain, an ultra-wideband spectrum characteristic of the technology of UWB radio pulses.

Thus, in order to locate the emitter device, first of all the pulses in the received signal should be detected. Indeed, it is only once the form of the radio signal is identified that is becomes possible to extract therefrom the information relative to the identity of the emitter device as well as to its position.

For this purpose, various methods allowing to identify the pulses of a received signal are known. In general, these methods are implemented by correlators taking a portion of characteristics related to the encoding of the emitted signal. For example, the receiver device can comprise a correlator storing a local replica of the emitted signal. Thus, the signal received is correlated with said local replica (by conjugate complex multiplication then integration over a time of approximately that of a pulse). In this way, the correlation relates only to the emitted signal, which allows to reduce the influence of noise. However, the use of a local replica is effective only if the emitted signal undergoes little distortion.

Another way to proceed involves using a correlator operating on the principle of a delayed reference transmission ("Delay-Hopped Transmitted-Reference", also designated by the acronym DHTR in the Anglo-Saxon literature). Typically, this involves encoding each piece of data transmitted by the presence, on the one hand, of a first pulse, called reference pulse, and on the other hand by the presence or the absence of a second pulse, called modulation pulse and separated from the reference pulse by a predetermined length called delay length, according to the value of the piece of data. The correlator is then configured to detect the presence or the absence of said modulation pulses by correlating the received signal with this same signal delayed by said delay length. This type of method provides good performance in terms of detection of pulses, including in the presence of distortions. However, it remains complicated to implement because a piece of data, a priori not intended to be encoded by a presence of a pulse because of its value, is nevertheless encoded by the presence of a reference pulse. In other words, the location system must be designed to be capable of transmitting this surplus of data, and thus of energy, which represents a disadvantage in terms of manufacturing costs and energy efficiency.

SUMMARY

The goal of the present disclosure is to overcome all or a portion of the disadvantages of the prior art, in particular those disclosed above, by proposing a solution that allows the detection, by a receiver device, of the pulses of a signal received by this receiver device, this detection being precise and robust with regard to distortions that the signal undergoes during its transmission. Moreover, the present disclosure aims to propose a solution limiting the number of pulses transmitted.

For this purpose, and according to a first aspect, the present disclosure relates to a method for the detection, by a receiver device, of a pulse of a signal received by said receiver device, said received signal corresponding to data emitted with a predetermined period Tc, each piece of data being encoded by a presence or an absence of a pulse. Moreover, said method comprises the following steps:
  a step of temporal offsetting of the received signal according to a predetermined number Ns of delays corresponding to different multiples of Tc, in such a way as to generate Ns delayed signals,
  a step of correlation, at a time that is a candidate for the detection of a pulse, of the received signal with each of the delayed signals, in such a way as to obtain Ns correlation values associated with said candidate time,
  a step of calculating a maximum correlation value among the Ns correlation values associated with the candidate time,
  a step of detection of a pulse of the received signal according to said maximum correlation value.

In specific modes of implementation, the method for the detection can further comprise one or more of the following features, taken alone or according to any technically possible combination.

In a specific mode of implementation, the number of pieces of data is equal to Nc and wherein two pieces of data respectively encoding presences of pulses are separated by at most Nm pieces of data respectively encoding absences of pulses, the number Ns of delayed signals is comprised in the interval [Nm+1,Nc−1] and the respective delays of said delayed signals are determined by $$Rj = j \times Tc,$$

with j an integer comprised in the interval [1,Ns].

In a specific mode of implementation, the number Ns of delayed signals is equal to Nm+1.

In a specific mode of implementation, the step of detection of pulses of the received signal comprises a comparison of the maximum correlation value associated with said candidate time to a predetermined threshold value, in such a way that a pulse is detected at said candidate time when the maximum correlation value of said candidate time is greater than said predetermined threshold value In a specific mode of implementation:
- the received signal is correlated with each of the delayed signals at a plurality of candidate times in such a way as to obtain Ns correlation values associated with each candidate time,
- the maximum correlation value among the correlation values associated with said candidate times is calculated.

In a specific mode of implementation:
- the received signal is correlated with each of the delayed signals at a plurality of candidate times in such a way as to obtain Ns correlation values associated with each candidate time,
- a maximum correlation value is calculated for each candidate time, among the Ns correlation values associated with said candidate time considered,
- a pulse is detected according to said maximum correlation values.

In a specific mode of implementation, the candidate times considered comprise an initial time and a final time, and the difference between the final time and the initial time is between Tc/2 and 3×Tc/2.

According to a second aspect, the present disclosure relates to a receiver device for the detection of a pulse of a signal received by said receiver device, said received signal corresponding to data emitted with a predetermined period Tc, each piece of data being encoded by a presence or an absence of a pulse. Moreover, said receiver device comprises:
- means configured to temporally offset the received signal by a predetermined number Ns of delays corresponding to different multiples of Tc, in such a way as to generate Ns delayed signals,
- means configured to correlate, at a time that is a candidate for the detection of a pulse, the received signal with each of the delayed signals, in such a way as to obtain Ns correlation values associated with said candidate time,
- means configured to calculate a maximum correlation value among the Ns correlation values associated with the candidate time,
- means configured to detect a pulse of the received signal according to said maximum correlation value.

In specific embodiments of the present disclosure, the receiver device can further comprise one or more of the following features, taken alone or according to any technically possible combination.

In a specific embodiment, the number of pieces of data is equal to Nc and in that two pieces of data respectively encoding a presence of a pulse are separated by at most Nm pieces of data respectively encoding an absence of a pulse, the number Ns of delayed signals is comprised in the interval [Nm+1,Nc−1] and the respective delays of said delayed signals are determined by $$Rj = j \times Tc,$$

with j an integer comprised in the interval [1,Ns].

In a specific embodiment, the number Ns of delayed signals is equal to Nm+1.

In a specific embodiment, the receiver device comprises means configured to compare the maximum correlation value associated with said candidate time to a predetermined threshold value, in such a way that a pulse is detected at said candidate time when the maximum correlation value of said candidate time is greater than said predetermined threshold value.

In a specific embodiment, the receiver device comprises:
- means configured to correlate the received signal with each of the delayed signals at a plurality of candidate times in such a way as to obtain Ns correlation values associated with each candidate time,
- means configured to calculate the maximum correlation value among the correlation values associated with said candidate times.

In a specific embodiment, the receiver device comprises:
- means configured to correlate the received signal with each of the delayed signals at a plurality of candidate times in such a way as to obtain Ns correlation values associated with each candidate time,
- means configured to calculate a maximum correlation value for each candidate time, among the Ns correlation values associated with said candidate time considered,
- means configured to detect a pulse according to said maximum correlation values.

In a specific embodiment, the candidate times considered comprise an initial time and a final time, and the difference between the final time and the initial time is between Tc/2 and 3×Tc/2.

BRIEF DESCRIPTION OF THE DRAWINGS

The present disclosure will be better understood upon reading the following description, given as an example that is in no way limiting, and made in reference to the drawings that show.

In these drawings, references identical from one drawing to another designate identical or analogous elements. For reasons of clarity, the elements shown are not to scale, unless otherwise mentioned.

DETAILED DESCRIPTION

The present disclosure belongs to the field of location of objects in an environment that is either closed, for example like a hangar or a warehouse, or open. Here, "location" refers to the determination of respective geographic coordinates of said objects relative to a point of reference of the environment in which these objects are positioned. This location can be two-dimensional, for example if all the objects are positioned in the same geometric plane, or three-dimensional.

Figure 1:
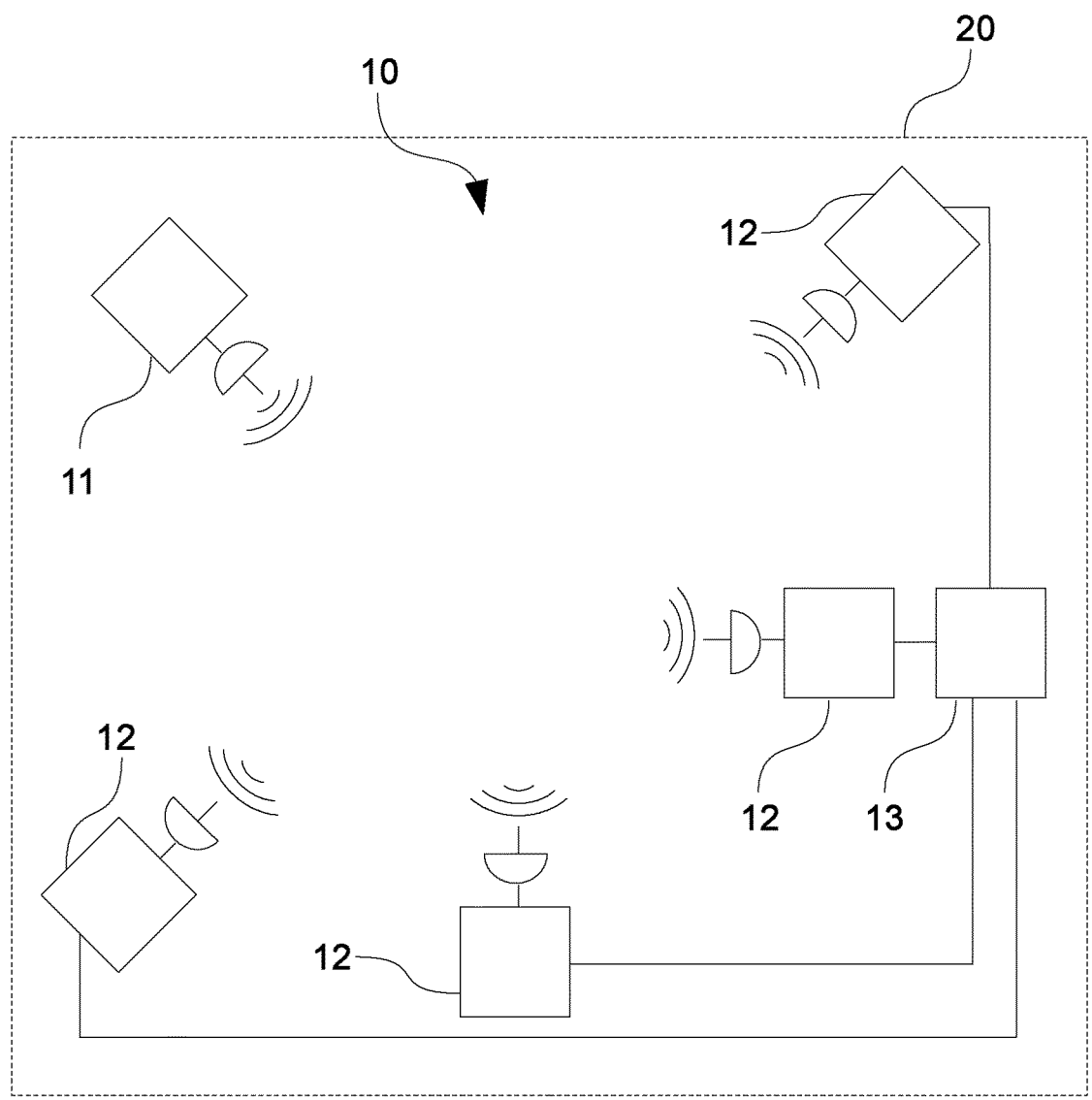
FIG. 1: a diagram of an example of realisation of a wireless location system.

FIG. 1 schematically shows an example of a wireless location system 10.

The wireless location system 10 comprises at least one emitter device 11 as well as a plurality of receiver devices 12. Said at least one emitter device 11 and said receiver devices 12 respectively comprise wireless communication means, considered to be known to a person skilled in the art. These wireless communication means are adapted to the exchange of data between said at least one emitter device 11 and said receiver devices 12 in the form of radioelectric signals. Here, "radioelectric signal" refers to an electromagnetic wave propagating by wireless means, the frequencies of which fall within the conventional spectrum of the radioelectric waves (several hertz to several hundred gigahertz).

In the rest of the description, a device is qualified as "energetically passive" when its operation is based on a consumption of energy provided via a wireless link with a remote piece of equipment, wherein this energy can be stored in said device in order to be used later. On the contrary, a device is qualified as "energetically active" when this device is configured to operate via an energy provided by a source to which this device must be connected continuously or recurrently via a physical link (for example an electrical cord). Such an energetically active device can further carry energy on board, in particular even before its first use (for example such as an electric energy contained in an integrated electric battery). In other words, the supply of energy to an energetically active device cannot be implemented via a wireless link with a remote piece of equipment.

In the present example of realisation, and in a way that is not at all limiting, said at least one emitter device 11 is energetically passive, and is configured in such a way as to store electric energy via capacitive effect. For this purpose, the receiver devices 12 are adapted to broadcast an electromagnetic field, this electromagnetic field being received by said at least one emitter device 11, when it is within its reach, and converted, in a manner known to a person skilled in the art, into electric currents. Once said at least one emitter device 11 has stored enough electric energy, it is activated and emits a radio signal, representative of data for example such as an identifier, and intended to be received by the receiver devices 12.

The rest of the description is aimed more specifically, but in a non-limiting way, at a wireless location system 10 of the UWB type, said at least one emitter device 11 of which is a radio marker (also called "tag" in the Anglo-Saxon literature). Said at least one emitter device 11 is placed on an object positioned in said environment 20, here closed as illustrated by FIG. 1. Moreover, the receiver devices 12, positioned at various places in the environment 20 (shown by the dotted lines in FIG. 1), are configured to continuously, or recurrently, broadcast, in said environment 20, an electromagnetic field according to a frequency belonging to a frequency band authorised by local regulations for the use of the radio marker, and with an emission power for example of approximately several watts. Such electromagnetic waves are for example a carrier modulated by frequency-hop technique.

Nothing, however, excludes, according to other examples, having energetically active emitter devices 11 respectively comprising, for example, electric batteries. Also, nothing excludes the wireless location system 10 being of another type, that is to say with a frequency bandwidth different than that of a UWB system, and the receiver devices 12 broadcasting electromagnetic waves, in the case of passive emitter devices, according to other frequencies.

For the rest of the description, and as illustrated by FIG. 1, the case is considered, in a way that is not at all limiting, in which the wireless location system 10 comprises a single emitter device 11, in particular for reasons of clarity and lightening the description. Nothing, however, excludes, according to other examples, the location system comprising more than one emitter device 11.

In the example illustrated by FIG. 1, the wireless location system 10 also comprises four receiver devices 12. Such a configuration is advantageously adapted to three-dimensional location of the emitter device 11, this location being for example carried out via TDOA (acronym for the Anglo-Saxon expression "Time Difference of Arrival") calculations of differences in times of arrival of a radio signal emitted by the emitter device 11, for a plurality of pairs of receiver devices 12, as known to a person skilled in the art. Alternatively, when the location of the emitter device 11 is two-dimensional, the use of three receiver devices 12 is sufficient.

Figure 2:
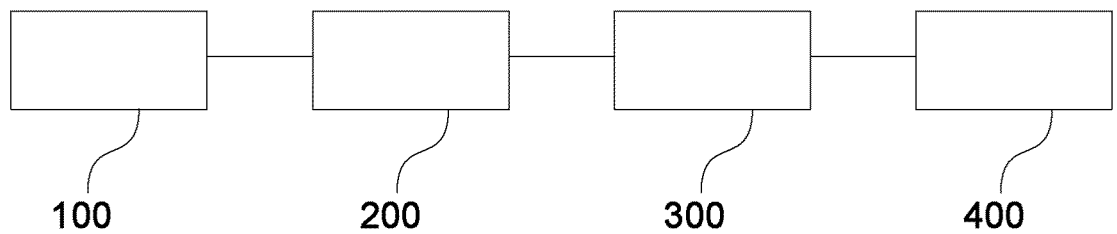
FIG. 2: an organisational chart of an example of implementation of a method for the detection, by a receiver device, of a pulse of a signal received by this receiver device.

FIG. 2 shows an organisational chart of an example of implementation of a method for the detection, by a receiver device 12, of a pulse of a signal received by said receiver device 12.

It should be noted that in the case in which the location system 10 comprises a plurality of receiver devices 12, said method is implemented independently by each of said receiver devices 12.

With regard to the implementation of said detection method, the receiver device 12 comprises for example a processing circuit (not shown in the drawings), comprising one or more processors and memorisation means (magnetic hard disk, solid-state memory, optical disk, etc.) in which a computer program product is memorised, in the form of a set of program code instructions to be executed in order to implement the various steps of the method for detection of a pulse of the received signal. Alternatively or in addition, the processing circuit of the receiver device 12 comprises one or more programmable logic circuits (FPGA, PLD, etc.), and/or one or more specialised integrated circuits (ASIC), and/or a set of discrete electronic components, etc., adapted to implement all or a portion of said steps of the method for the detection of a pulse of the received signal.

In other words, the processing circuit of the receiver device 12 comprises a set of means configured in a software manner (specific computer program product) and/or physically (FPGA, PLD, ASIC, discrete electronic components, etc.) to implement the steps of the method for the detection of a pulse of the received signal.

Figure 3:
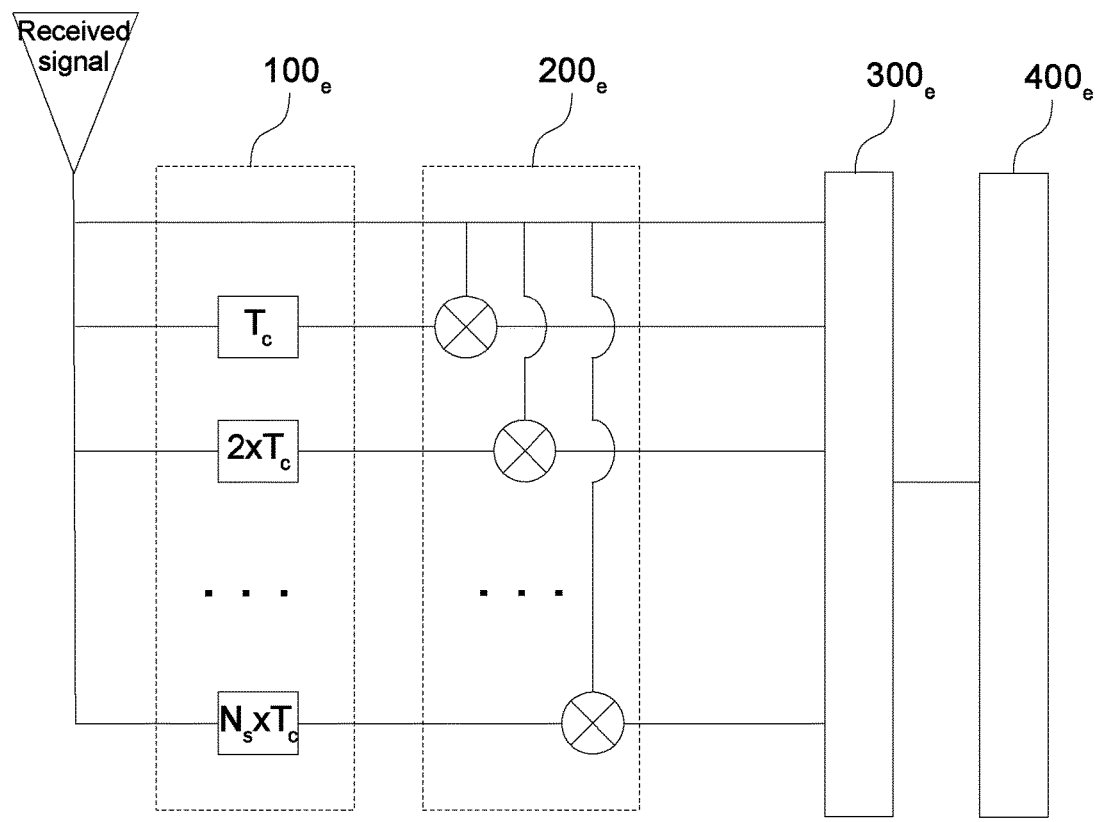
FIG. 3: a diagram of an example of architecture of a portion of the receiver device.

FIG. 3 schematically shows an example of architecture of a portion of the receiver device 12, said portion being adapted to the implementation of the detection method according to the present disclosure. As illustrated by FIG. 3, this portion of the device 12 comprises a temporal-offsetting stage 100e, a correlation stage 200e, a calculation stage 300e as well as a detection stage 400e. The functions respectively carried out by these various stages are described in detail below with the detailed description of said detection method. It will be clear to a person skilled in the art that FIG. 3 forms an illustrative example given in a way that is not at all limiting, and that such a receiver device 12 can for example also comprise, in a known manner, one or more filters and/or one or more low-noise amplifiers positioned, for example, between means for reception of the signal and the temporal-offsetting stage 100e.

The signal received by the receiver device 12 corresponds to data emitted with a predetermined period Tc, each piece of data being encoded by a present or an absence of a pulse, a pulse having a predetermined length Ti. For the rest of the description, the number of pieces of data emitted is noted as Nc.

It is therefore understood that, by this implementation, the length Ti of a pulse is less than Tc, and that two successive pulses are separated by a time equal to Tc.

For example, the period Tc of emission of data is equal to 250 nanoseconds and the length Ti of a pulse is equal to 20 nanoseconds. Nothing excludes, however, according to other examples not described in detail here, having other values for the period Tc and the length Ti as long as said length Ti remains less than said period Tc and is associated with a frequency spectrum characteristic of UWB technology.

Moreover, a piece of data emitted is associated with a time window having a length Tc, said window comprising or not comprising a pulse according to the encoding of said piece of data, and in such a way that the combination of the time windows associated with all the pieces of data emitted covers the total duration of the signal emitted by the emitter device 11. The time window of a piece of data comprises a start time and an end time, separated from said start time by the length Tc.

In the present example of implementation, the signal received by the receiver device 12 has previously been emitted by the emitter device 11 in the form of a radio signal. The data is generated by said emitter device 11 and is, for example, representative of a unique identifier of the latter. This identifier is then intended to be found by the receiver device 12 upon reception of said radio signal, in order in particular to associate the received signal with said emitter device 11. Moreover, the data emitted can be represented, in a known manner, in the form of bits taking values of "1" or "0" according to whether it is associated respectively with a presence of a pulse or an absence of a pulse. For this purpose, the data is preferably emitted according to a modulation of the "OOK" type (acronym for the Anglo-Saxon expression "On-Off Keying"), known to a person skilled in the art. In this manner, in comparison to the prior art, it is noted that it is not necessary for a piece of data to be encoded by two pulses in the emitter device 11, and thus the number of pulses transmitted remains limited. Nothing, however, excludes, according to other examples not described in detail here, the pulses from being generated via a different modulation.

In the rest of the description, the convention is adopted according to which the components of a vector are read from left to right. Data emitted by an emitter device 11, and received by the receiver device 12, is represented by a vector, each component of said vector corresponding to one of said pieces of data emitted, said vector being further ordered from left to right according to the increasing arrival times of the data.

For example, a signal S is considered, emitted by the emitter device 11 and received by the receiver device 12, in such a way that S corresponds to the emitted data (1,0,0,1,1). In this case, the first piece of data emitted is encoded by a presence of a pulse, the second piece of data is encoded by an absence of a pulse, etc, and the duration of the signal S is equal to 5×Tc.

It should also be noted that the receiver device 12 operates beyond the duration of the received signal, that is to say before and after reception of the latter. Therefore, outside of the reception of the signal corresponding to the data emitted by the emitter device 11, the receiver device 12 does not receive any signal, except for possibly residual noise having an amplitude of substantially zero.

In a specific mode of implementation, the data emitted by the emitter device 11 is previously recorded by a spreading sequence modulated by a packet of pre-data. Such a manner of proceeding has the effect of increasing the frequency of each piece of pre-data of the packet, thus producing, in the frequency domain, a spreading of the spectrum of a signal corresponding only to the pre-data packet. Such a manner of proceeding, generally designated by the expression "direct-sequence spectrum spreading", as well as the resulting advantages, are well known to a person skilled in the art.

As an example that is in no way limiting, the spreading sequence is a pseudo-random sequence, also called "PRN" sequence (acronym for the Anglo-Saxon expression "Pseudo Random Noise"). For example, said pseudo-random sequence is a binary sequence of the m-sequence type. Nothing, however, excludes, according to other examples, having a pseudo-random sequence of another type such as a sequence called "Gold" sequence, or called "Barker" sequence, or called "Hadamard-Walsh" sequence, etc.

In a manner known to a person skilled in the art, the signal obtained after encoding of the data by the absence or the presence of a pulse modulates, before emission, a carrier frequency with the goal of transporting the information contained in said signal obtained. Analogously, the signal received by the receiver device 12 can be demodulated relative to said carrier frequency. Such a manner of proceeding is not described in detail here for reasons of simplicity and clarity of writing. Moreover, the signal received by the receiver device 12 can be substantially different than the radio signal emitted by the emitter device 11 in that it has possibly undergone distortions during its transmission. Nevertheless, if these distortions can substantially affect the shape of the pulses transmitted, the pulses received by the emitter device nevertheless keep respective lengths substantially equal to Ti, and remain associated with data having the period Tc.

In order to generate the emitted radio signal, the emitter device 11 comprises, for example, a processing circuit (not shown in the drawings), comprising one or more processors and memorisation means (magnetic hard disk, solid-state memory, optical disk, etc.) in which a computer program product is memorised, in the form of a set of program code instructions to be executed in order to implement the various steps of the method for estimating the arrival time of the radio signal. Alternatively or in addition, the processing circuit of the emitter device 11 comprises one or more programmable logic circuits (FPGA, PLD, etc.), and/or one or more specialised integrated circuits (ASIC), and/or a set of discrete electronic components, etc., adapted to generate the radio signal emitted.

In other words, the processing circuit of the emitter device 11 comprises a set of means configured in a software manner (specific computer program product) and/or physically (FPGA, PLD, ASIC, discrete electronic components, etc.) to implement the steps of the method for detecting pulses.

Therefore, the method for detection, by the receiver device 12, of pulses of the received signal comprises a plurality of successive steps. According to its main principle, said method involves first of all generating delayed signals in a limited number, on the basis of the received signal. These delayed signals are then correlated with the received signal in order to obtain correlation values at a candidate time. On the basis of these correlation values, it is then possible to decide whether said candidate time is associated with a presence of a pulse or with an absence of a pulse. In comparison to the prior art, the goal of this method is to allow a precise and robust detection of the pulses, without it being necessary to increase the number of pulses transmitted by the emitter device 11.

Here, "candidate time" refers to a time at which the receiver device 12 seeks to determine whether the received signal comprises a pulse. This point is explained in more details below, in particular with regard to the determination of a candidate time.

For this purpose, the detection method comprises, first, a step 100 of temporal offsetting of the received signal according to a predetermined number Ns of delays corresponding to different multiples of Tc, in such a way as to generate Ns delayed signals.

It is therefore understood that the Ns delayed signals are generated by the receiver device 12 as soon as the signal emitted by the emitter device 11 is received by said receiver device 12. These delayed signals all have a form identical to that of the received signal. The fact that these delayed signals are generated during the step 100 by the receiver device 12 advantageously allows to use the received signal as a reference signal for later steps of the detection method, in particular for a correlation of the received signal with the delayed signals. By proceeding in this manner, it is also understood that the emitted signal (more particularly the train of pulses emitted) is not used as a reference signal.

Figure 4:
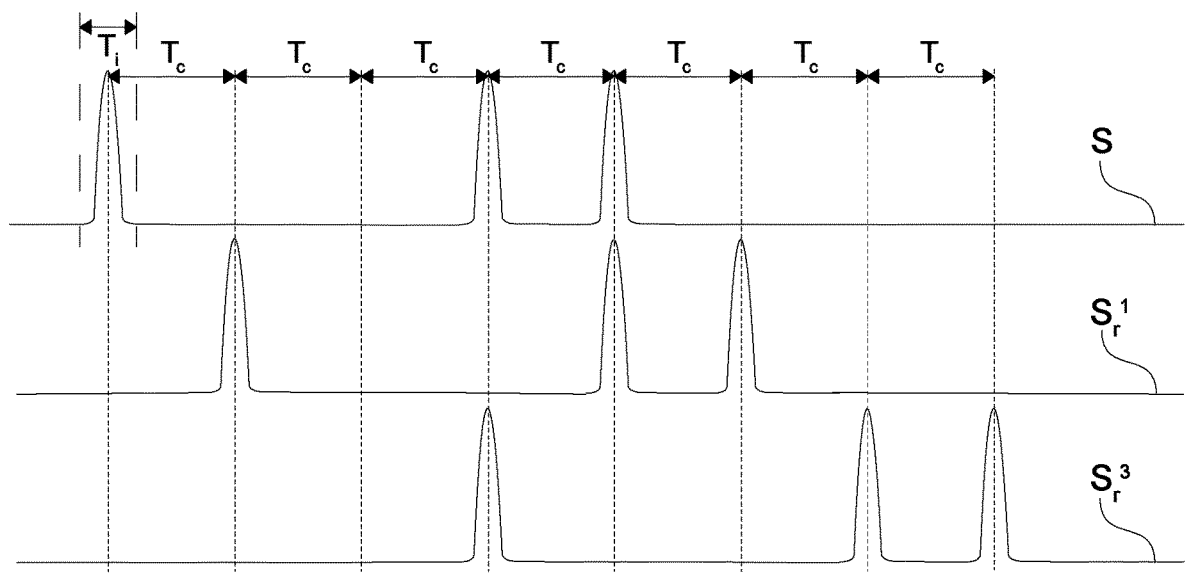
FIG. 4: a diagram of a signal received as well as of signals delayed by the detection method according to the present disclosure.

FIG. 4 schematically illustrates a received signal as well as delayed signals. In the example illustrated by FIG. 4, in a way that is not at all limiting, a signal S that can be represented as (1,0,0,1,1), as well as a first delay R1 equal to Tc, and a second delay R3 equal to 3×Tc, are considered. Thus, the delayed signal obtained after temporal offsetting of the signal S according to said first delay R1 can be represented as $S_r^1=(0,1,0,0,1,1)$. Identically, the delayed signal obtained after temporal offsetting of the signal S according to said second delay R3 can be represented as $S_r^3=(0,0,0,1,0,0,1,1)$. Such signals can also be represented for example via a matrix M written as:

$$M = \begin{pmatrix} 1 & 0 & 0 & 1 & 1 & 0 & 0 \\ 0 & 1 & 0 & 0 & 1 & 1 & 0 \\ 0 & 0 & 1 & 0 & 0 & 1 & 1 \end{pmatrix}$$

in such a way that the first, second and third row of the matrix M correspond respectively to S, $S_r^1$ and $S_r^3$.

The detection method then comprises a step 200 of correlation, at a candidate time, of the received signal with each of the delayed signals, in such a way as to obtain Ns correlation values associated with said candidate time.

A candidate time thus corresponds to a time at which it is desired to determine whether the received signal comprises a pulse by correlation of said received signal with the delayed signals. The correlation, at a candidate time, of the received signal with a delayed signal is carried out here in a manner known per se, that is to say by conjugate complex multiplication then integration over a predetermined time, for example substantially equal to Ti, in such a way as to provide a result (a complex value) that, once the modulus thereof is taken, is equal to the correlation value associated with said candidate time as well as with said delayed signal considered. Consequently, here, a correlation value is a real number.

It is understood that an advantageous arrangement would involve having a receiver device 12 executing a correlation at the beginning of each time window of a piece of data, over a time substantially equal to Ti and under the hypothesis that, when a piece of data encodes a pulse, this pulse starts at the start time of the time window associated with said piece of data.

That being said, it should be noted that the receiver device 12 does not have any a priori knowledge of the time of reception of the emitted signal. This is why, the receiver device 12 executes correlations recurrently, according to a predetermined period, and the times at which these correlations are executed correspond to candidate times.

Nothing, however, excludes, according to other examples not described in detail here, a pulse encoding a piece of data being positioned in the time window associated with said piece of data in such a way that it starts at a time different than the start time of said time window, in which case there would be an advantage, according to the modes described above, for the receiver device 12 to execute a correlation at the beginning of each pulse over a time substantially equal to Ti.

For the rest of the description, the convention is adopted according to which candidate times form a discrete set in which two successive times are separated by a time Tc. In this way, each piece of data is associated with a single candidate time. Preferably, it is also considered that a pulse begins at a candidate time.

Typically, a correlation value at a candidate time, obtained during step 200, is:
  either substantially zero: this possibility corresponds to a correlation, at said candidate time, between a first piece of data of the received signal and a second piece of data of a delayed signal, the first piece of data and/or the second piece of data being encoded by a bit having a value of 0. Therefore, this correlation value is associated with an absence of a pulse;
  or substantially equal to the energy contained in a pulse: this possibility corresponds to a correlation, at said candidate time, between a first piece of data of the received signal and a second piece of data of a delayed signal, the first piece of data and the second piece of data being respectively encoded by a bit having a value of 1. Therefore, this correlation value is associated with a presence of a pulse. It should be noted that the correlation value can be substantially different than the energy theoretically contained in a pulse generated by an emitter device 11 because of distortions undergone during the transmission of the signal. Such an arrangement does not in any way negatively affect the implementation of the present disclosure as disclosed.

As an example that is not at all limiting, a signal S that can be represented as (1,0,0,1,1), as well as a delayed signal $S_r^1=(0,1,0,0,1,1)$ obtained after temporal offsetting of the signal S according to a delay R1 equal to Tc, are considered. These signals can be represented by the matrix M such that $$M = \begin{pmatrix} 1 & 0 & 0 & 1 & 1 & 0 \\ 0 & 1 & 0 & 0 & 1 & 1 \end{pmatrix}$$

in such a way that the first and second row of the matrix M correspond respectively to S and $S_r^1$. Thus, the correlation value obtained at the initial candidate time of S, after correlation with said delayed signal, is substantially zero. The same applies to the second, third and fourth candidate time of S. As for the correlation value of the fifth candidate time of S, it is substantially equal to the energy contained in a pulse. Finally, the correlation values obtained beyond the fifth candidate time are all substantially zero.

It should be noted that the implementation of step 200 does not allow to detect the first pulse of the received signal. Indeed, by the very definition of said first pulse, the receiver device 12 perceives a signal having an amplitude of substantially zero (in other words, a series of bits having respective values of 0) before the reception of said first pulse. Therefore, the correlation value obtained a candidate time positioned during said first pulse, by correlation of the received signal with any one of the delayed signals, will always be substantially zero, in such a way that no pulse can be detected. It should, however, be specified that the fact that the first pulse of the received signal cannot be detected does not have a negative effect on the location of the receiver device 11. Indeed, the number of pieces of data emitted by the latter is high, typically greater than 1000, and thus even if the first pulse is not detected, the detection of all the other pulses emitted allows a robust identification of the identifier of the receiver device 11.

The detection method then comprises a step 300 of calculating a maximum correlation value among the Ns correlation values associated with the candidate time.

In principle, this step 300 involves determining, at the candidate time, a maximum correlation value that thus represents the basis of a criterion for decision as to the presence or not of a pulse at said candidate time. Indeed, detecting a pulse at a candidate time means detecting an energy at this time, which is evaluated in light of the correlation values associated with said time.

In order to determine the maximum correlation value associated with a candidate time, it is possible to combine the various correlation values associated with said candidate time into a set, then determine the maximum of this set. The determination of such a maximum is carried out via algorithms well known to a person skilled in the art.

The detection method finally comprises a step 400 for detection of a pulse of the received signal according to said maximum correlation value.

Thus, in a specific mode of implementation, step 400 comprises, at the candidate time, a comparison of the maximum correlation value associated with said candidate time to a predetermined threshold value, in such a way that a pulse is detected at said candidate time when the maximum correlation value of said candidate time is greater than said predetermined threshold value. For example, said threshold value is chosen in such a way as to be less than or equal to the energy of a pulse (such an energy being known insofar as the pulses of the location system are generated via a predetermined modulation), as well as greater than the energy of the residual noise received by the receiver device 12. Proceeding in this manner advantageously allows to avoid identifying residual noise as a pulse and to establish a criterion for decision as to the presence or not of a pulse at a candidate time.

The case will now be considered in which two consecutive candidate times can be separated by a time different than Tc. Thus, in a particular mode of implementation of the method for detecting a pulse, the received signal is correlated, during step 200, with each of the delayed signals at a plurality of candidate times in such a way as to obtain Ns correlation values associated with each candidate time. Then, the maximum correlation value is calculated, during step 300, among the correlation values associated with said candidate times.

Thus, if the maximum correlation value calculated is such that it leads to a detection of a pulse during step 400, then it is deduced therefrom that said pulse is positioned in the received signal at the candidate time associated with said maximum correlation value.

The number of candidate times considered in order to detect a pulse is noted as Ni. According to the present mode of implementation, a number of correlation values equal to Ns×Ni is therefore obtained. It is thus understood that seeking the maximum correlation value is equivalent to seeking the maximum of a table of values, comprising Ns rows and Ni columns, and thus having a size equal to Ns×Ni. The determination of such a maximum is carried out via algorithms well known to a person skilled in the art. For example, a maximum correlation value is calculated for each candidate time, among the Ns correlation values associated with said candidate time considered. Ni maximum correlation values respectively associated with said Ni candidate times are thus obtained. A pulse is then detected according to said Ni maximum correlation values, for example by calculating the maximum of said Ni maximum correlation values.

Proceeding in this manner is advantageous since this allows to take into account a plurality of candidate times in each time window associated with a piece of data. Thus, configurations in which there is only one candidate time per time window of a piece of data (for example if two consecutive candidate times are separated by a time Tc) and in which the candidate time associated with a time window of a piece of data is each time positioned outside of the length Ti of a pulse, if said time window effectively comprises a pulse, are avoided. In other words, this specific mode of implementation thus involves increasing the number of correlations carried out in a time window associated with a piece of data in such a way as to, on the one hand, increase the probability of detecting a pulse in this time window, and on the other hand, determine precisely the position of a pulse.

In a specific mode of implementation, the candidate times considered comprise an initial time and a final time, and the difference between the final time and the initial time is between Tc/2 and 3×Tc/2. The number of candidate times comprised between said initial and final time depends on the time separating two consecutive candidate times. For example, said difference is substantially equal to Tc and the time between two consecutive candidate times is equal to Tc/9 and thus the number Ni of candidate times considered is equal to 10.

As mentioned above, in order for a pulse to be detected at a candidate time, if a pulse must effectively be detected at this candidate time, it is necessary for the piece of data of the received signal associated with said candidate time to be correlated with a piece of data of a delayed signal also encoding a pulse, in such a way as to generate at least one correlation value greater than said predetermined threshold (which implies that the maximum correlation value associated with said candidate time is also greater than said predetermined threshold).

Moreover, insofar as the presence of a pulse at a candidate time is not a piece of information known to the receiver device 12 upon reception of the signal, it is understood that if a correlation value is substantially zero, after correlation at a candidate time between a first piece of data of the received signal and a second piece of data of a delayed signal, it is not possible to known a priori which of said first and second piece of data is encoded by a bit having a value of 0.

This is why, in order to detect precisely and with certainty the pulses of the received signal, not only should said received signal be correlated with a sufficient number of delayed signals, but the delays of these delayed signals should also be determined in an appropriate manner.

For this purpose, in a preferred mode of implementation, when two pieces of data respectively encoding presences of pulses are separated by at most Nm pieces of data respectively encoding absences of pulses, the number Ns of delayed signals is comprised in the interval [Nm+1,Nc−1], the respective delays of said delayed signals being determined by $$Rj = j \times Tc,$$

with j an integer comprised in the interval [1,Ns].

When the number Ns of delayed signals is for example equal to Nc−1, as many delayed signals as pieces of data contained in the received signal beyond the first piece of data of said received signal are generated, which allows to detect with certainty the pulses of said received signal. Indeed, all the pieces of data of the received signal encoded by a pulse, and emitted after the first pulse of said received signal, will necessarily be correlated with said first pulse of the signal. Proceeding in this way thus forms a robust and precise manner of identifying the pulses of the signal received by the receiver device 12.

Moreover, it is not necessary for Ns to be equal to Nc−1 in order to be sure to detect the pulses of the received signal. Indeed, in order to carry out a certain detection of the pulses, it suffices for a piece of data encoded by a pulse to be correlated, at the candidate time that is associated with it, with a sufficient number of delayed signals in such a way that at least one of the correlation values associated with this piece of data is obtained by correlation of said piece of data with another piece of data certainly encoded by a pulse. Therefore, if a number of delayed signals at least equal to Nm+1 is generated, the certain detection of the pulses is ensured since regardless of the piece of data that it is desired to identify, it is certain that it will be correlated during the detection method by at least one other piece of data encoded by a pulse.

In order to illustrate this preferred mode of implementation, a received signal S having the form (1,1,0,1,0,0,1) is considered. It is thus observed that in this case, Nm is equal to 2. The situation is considered in which it is desired to specifically detect the seventh piece of data of the signal S, which is thus encoded here by a pulse since it is represented by a bit having a value of 1. Therefore, in other words, delayed signals $S_r^1$, $S_r^2$ and $S_r^3$ corresponding to temporal offsets of the signal S according to delays respectively equal to R1, R2 and R3. In other words:

$$S_r^1 = (0,1,1,0,1,0,0,1),$$

$$S_r^2 = (0,0,1,1,0,1,0,0,1),$$

$$S_r^3 = (0,0,0,1,1,0,1,0,0,1).$$

These signals can be represented by the matrix M such that $$M = \begin{pmatrix} 1 & 1 & 0 & 1 & 0 & 0 & 1 & 0 & 0 & 0 \\ 0 & 1 & 1 & 0 & 1 & 0 & 0 & 1 & 0 & 0 \\ 0 & 0 & 1 & 1 & 0 & 1 & 0 & 0 & 1 & 0 \\ 0 & 0 & 0 & 1 & 1 & 0 & 1 & 0 & 0 & 1 \end{pmatrix}$$

in such a way that the first, second, third and fourth row of the matrix M respectively correspond to S, $S_r^{12}$, $S_r^2$ and $S_r^3$.

It is thus observed that the correlation between the received signal S and the delayed signal $S_r^1$, at the seventh candidate time, does not allow to detect the pulse associated with the seventh piece of data of the signal S insofar as the correlation value obtained is substantially zero (the seventh piece of data of the signal $S_r^1$ being encoded by an absence of a pulse, or a bit having a value of 0). These arguments also apply with regard to the correlation between the received signal S and the delayed signal $S_r^2$. However, as for the correlation between the received signal S and the delayed signal $S_r^3$, at the seventh candidate time, it indeed allows to detect the pulse associated with the seventh piece of data of the signal S insofar as the correlation value obtained is substantially equal to the energy of a pulse (the seventh piece of data of the signal $S_r^3$ being encoded by a presence of a pulse, or a bit having a value of 1).

It also appears in this example that the correlation between the signal S and delayed signal $S_r^j$ with j belonging to the interval [1,6], corresponding respectively to temporal offsets of the signal S according to a delay equal to Rj, allows to detect all the pulses located beyond the first pulse of said signal S. However, it is not necessary to generate the totality of these signals, moreover or even of the delayed signals with delays greater than R3, insofar as the use of said signals $S_r^1$, $S_r^2$ and $S_r^3$, according to the present disclosure, suffices to obtain a certain detection of the pulses of the signal. For this purpose, preferably, the number Ns of delayed signals is equal to Nm+1. This preferred implementation is particularly advantageous insofar as it limits the number of delayed signals generated by the receiver device 12, in such a way as to simply the design thereof in particular when the number Nm is small in comparison to the number Nc.

It should be noted that this preferred mode of implementation has a particularly advantageous use in a configuration in which, upon emission, the location of the pulses in the signal is not known, but in which the information relative to said number Nm of pieces of data is, however, available, which is typically the case when the data is generated by the emitter device 11 by modulating a spreading sequence.

More generally, it should be noted that the modes of implementation and embodiments considered above have been described as non-limiting examples, and that other alternatives are consequently possible.

In particular, the present disclosure has been described while considering a UWB wireless location system. Nothing, however, excludes, according to other examples, considering other types of communication systems. The present disclosure has, however, a particularly advantageous use in ultra-wideband wireless communication systems, that is to say having an absolute bandwidth (at −10 dB with respect to the power measured at the central frequency) greater than 500 megahertz.

What is claimed is:

1. Method for the detection, by a receiver device, of a pulse of a signal received by said receiver device, said received signal corresponding to data emitted with a predetermined period $T_c$, each piece of data being encoded by a presence or an absence of a pulse, wherein said method comprises:
temporally offsetting of the received signal according to a predetermined number $N_s$ of delays corresponding to different multiples of $T_c$, in such a way as to generate $N_s$ delayed signals,
correlating, at a time that is a candidate for the detection of a pulse, the received signal with each of the delayed signals, in such a way as to obtain $N_s$ correlation values associated with said candidate time,
calculating a maximum correlation value among the $N_s$ correlation values associated with the candidate time, and
detecting a pulse of the received signal according to said maximum correlation value.

2. The method according to claim 1, wherein the number of pieces of data is equal to $N_c$ and wherein two pieces of data respectively encoding presences of pulses are separated by at most $N_m$ pieces of data respectively encoding absences of pulses, the number $N_s$ of delayed signals is comprised in the interval $[N_m+1, N_c-1]$ and the respective delays of said delayed signals are determined by $$R_j = j \times T_c,$$

with j an integer comprised in the interval $[1, N_s]$.

3. The method according to claim 2, wherein the step of detection of pulses of the received signal comprises a comparison of the maximum correlation value associated with said candidate time to a predetermined threshold value, in such a way that a pulse is detected at said candidate time when the maximum correlation value of said candidate time is greater than said predetermined threshold value.

4. The method according to claim 2, wherein the number $N_s$ of delayed signals is equal to $N_m+1$.

5. The method according to claim 4, wherein the step of detection of pulses of the received signal comprises a comparison of the maximum correlation value associated with said candidate time to a predetermined threshold value, in such a way that a pulse is detected at said candidate time when the maximum correlation value of said candidate time is greater than said predetermined threshold value.

6. The method according to claim 1, wherein the step of detection of pulses of the received signal comprises a comparison of the maximum correlation value associated with said candidate time to a predetermined threshold value, in such a way that a pulse is detected at said candidate time when the maximum correlation value of said candidate time is greater than said predetermined threshold value.

7. The method according to claim 1, wherein:
the received signal is correlated with each of the delayed signals at a plurality of candidate times in such a way as to obtain $N_s$ correlation values associated with each candidate time,
the maximum correlation value among the correlation values associated with said candidate times is calculated.

8. The method according to claim 7, wherein the candidate times considered comprise an initial time and a final time, and the difference between the final time and the initial time is between $T_c/2$ and $3 \times T_c/2$.

9. The method according to claim 1, wherein:
the received signal is correlated with each of the delayed signals at a plurality of candidate times in such a way as to obtain $N_s$ correlation values associated with each candidate time,
a maximum correlation value is calculated for each candidate time, among the $N_s$ correlation values associated with said candidate time considered,
a pulse is detected according to said maximum correlation values.

10. The method according to claim 9, wherein the candidate times considered comprise an initial time and a final time, and the difference between the final time and the initial time is between $T_c/2$ and $3 \times T_c/2$.

11. A receiver device for the detection of a pulse of a signal received by said receiver device, said received signal corresponding to data emitted with a predetermined period $T_c$, each piece of data being encoded by a presence or an absence of a pulse, wherein said receiver device comprises a processing circuit configured to:
temporally offset the received signal according to a predetermined number $N_s$ of delays corresponding to different multiples of $T_c$, in such a way as to generate $N_s$ delayed signals,
correlate, at a time that is a candidate for the detection of a pulse, the received signal with each of the delayed signals, in such a way as to obtain $N_s$ correlation values associated with said candidate time,
calculate a maximum correlation value among the $N_s$ correlation values associated with the candidate time,
detect a pulse of the received signal according to said maximum correlation value.

12. The receiver device according to claim 11, wherein the number of pieces of data is equal to $N_c$ and wherein two pieces of data respectively encoding a presence of a pulse are separated by at most $N_m$ pieces of data respectively encoding an absence of a pulse, the number $N_s$ of delayed signals is comprised in the interval $[N_m+1, N_c-1]$ and the respective delays of said delayed signals are determined by $$R_j = j \times T_c,$$

with j an integer comprised in the interval $[1, N_s]$.

13. The receiver device according to one claim 12, wherein said processing circuit is configured to compare the maximum correlation value associated with said candidate time to a predetermined threshold value, in such a way that a pulse is detected at said candidate time when the maximum correlation value of said candidate time is greater than said predetermined threshold value.

14. The receiver device according to claim 12, wherein the number $N_s$ of delayed signals is equal to $N_m+1$.

15. The receiver device according to one claim 14, wherein said processing circuit is configured to compare the maximum correlation value associated with said candidate time to a predetermined threshold value, in such a way that a pulse is detected at said candidate time when the maximum correlation value of said candidate time is greater than said predetermined threshold value.

16. The receiver device according to one claim 11, wherein said processing circuit is configured to compare the maximum correlation value associated with said candidate time to a predetermined threshold value, in such a way that a pulse is detected at said candidate time when the maximum correlation value of said candidate time is greater than said predetermined threshold value.

17. The receiver device according to claim 11, wherein said processing circuit is configured to:
- correlate the received signal with each of the delayed signals at a plurality of candidate times in such a way as to obtain $N_s$ correlation values associated with each candidate time,
- calculate the maximum correlation value among the correlation values associated with said candidate times.

18. The receiver device according to claim 17, wherein the candidate times considered comprise an initial time and a final time, and the difference between the final time and the initial time is between $T_c/2$ and $3 \times T_c/2$.

19. The receiver device according to claim 11, wherein said processing circuit is configured to:
- correlate the received signal with each of the delayed signals at a plurality of candidate times in such a way as to obtain $N_s$ correlation values associated with each candidate time,
- calculate a maximum correlation value for each candidate time, among the $N_s$ correlation values associated with said candidate time considered,
- detect a pulse according to said maximum correlation values.

20. The receiver device according to claim 19, wherein the candidate times considered comprise an initial time and a final time, and the difference between the final time and the initial time is between $T_c/2$ and $3 \times T_c/2$.

* * * * *